(12) United States Patent
Schuster et al.

(10) Patent No.: US 7,657,814 B2
(45) Date of Patent: Feb. 2, 2010

(54) OPTIMIZING AVAILABILITY AND SAFETY BY RECONFIGURING AND AUTO-ADJUSTING REDUNDANCY

(75) Inventors: George K. Schuster, Royal Oak, MI (US); James E. Dogul, Hudson, NH (US); Richard Galera, Nashua, NH (US); George E. Rollins, Chelmsford, MA (US); Derek W. Jones, Dumfries Galloway (GB); Suresh R. Nair, Amherst, NH (US); Ray C. Delcher, Oxnard, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 711 days.

(21) Appl. No.: 11/360,177

(22) Filed: Feb. 23, 2006

(65) Prior Publication Data

US 2007/0198106 A1    Aug. 23, 2007

(51) Int. Cl.
*G06F 11/00* (2006.01)
*G06F 11/30* (2006.01)

(52) U.S. Cl. .......................... 714/746; 714/1

(58) Field of Classification Search ............... 700/79, 700/83, 99; 714/1, 11, 746, 55, 797
See application file for complete search history.

(56) References Cited

U.S. PATENT DOCUMENTS

| | | | |
|---|---|---|---|
| 4,377,000 A | 3/1983 | Staab | |
| 4,818,866 A | 4/1989 | Weber | |
| 5,057,994 A | 10/1991 | Spiller | |
| 5,796,935 A * | 8/1998 | Morrison et al. | 714/11 |
| 6,012,147 A * | 1/2000 | Waedt et al. | 714/1 |
| 6,608,559 B1 | 8/2003 | Lemelson et al. | |
| 6,837,045 B2 | 1/2005 | Heusser | |
| 6,847,854 B2 * | 1/2005 | Discenzo | 700/99 |
| 6,853,920 B2 | 2/2005 | Hsiung et al. | |
| 6,865,509 B1 | 3/2005 | Hsiung et al. | |
| 6,985,779 B2 | 1/2006 | Hsiung et al. | |
| 6,997,090 B2 | 2/2006 | Gass et al. | |
| 7,167,762 B2 * | 1/2007 | Glanzer et al. | 700/79 |

* cited by examiner

*Primary Examiner*—Shelly A Chase
(74) *Attorney, Agent, or Firm*—Turocy & Watson LLP; William R. Walbrun

(57) ABSTRACT

The claimed subject matter provides industrial automation systems and/or methods that configure available redundancy. An interface component can obtain input data. Additionally, an optimization component can generate a voting configuration that allocates available redundancy to provide an optimized combination of safety and availability based at least in part on the input data.

34 Claims, 14 Drawing Sheets

OPTIMIZING AVAILABILITY AND SAFETY BY RECONFIGURING AND AUTO-ADJUSTING REDUNDANCY

TECHNICAL FIELD

The claimed subject matter relates to industrial control systems and, more particularly, to reconfiguring and/or adjusting redundancy to facilitate optimizing availability and/or safety.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

Industrial controllers can be employed to effectuate completion of most industrial processes. Industrial controllers are special-purpose computers utilized for controlling industrial processes, manufacturing equipment, and other factory automation processes, such as data collection through networked systems. Controllers often work in concert with other computer systems to form an environment whereby a majority of modern and automated manufacturing operations occur. These operations involve front-end processing of materials such as steel production to more intricate manufacturing processes such as automobile production that involve assembly of previously processed materials. Oftentimes, such as in the case of automobiles, complex assemblies can be manufactured with high technology robotics assisting the industrial control process.

Industrial automation environments commonly utilize redundancy to provide availability and/or safety. For instance, two or more industrial automation devices (e.g., sensors, logic solvers, . . . ) can be employed in connection with a particular machine and/or process and disparate outputs from the devices can be combined. Each of the industrial automation devices can provide an output (e.g., vote) related to the particular machine, and the outputs can be combined to effectuate an action, to yield a measured condition, to continue and/or halt operation of the machine, etc. By way of example, a system designed for safety can include two controllers such that a machine can be shut off with the output from either of the controllers. Additionally, for instance, a single unit can include any number (e.g., two) of devices (e.g., processors) that can employ a similar fixed voting scheme that can provide safety. Accordingly, the outputs from the controllers and/or devices can be combined such that if either of the controllers and/or devices votes to shut off the machine, then the machine halts operation. Thus, safety can be provided since either one of the controllers and/or devices can be utilized to stop the machine, even if the other controller and/or device fails to turn off the machine, and the machine can be inhibited from further operation until correction of the failure. Pursuant to another illustration, the outputs from two controllers and/or two devices (e.g., that can be included in a single packaged device) can be combined such that the machine can remain operational when one of the controllers and/or devices provides a fault. Thus, the outputs of the controllers and/or devices can be combined to enable high availability where the machine can operate even when a fault occurs. Thus, industrial automation devices can be utilized to enable safety and/or availability; however, conventional architectures provide fixed voting relationships between the industrial automation devices.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to systems and/or methods that facilitate optimizing utilization of available redundancy. The available redundancy can be configured to provide a level of safety and/or a level of availability. For instance, a configuration can be provided that implements a safety system that can be highly available, an availability system that can perform a safety function, a system that provides a very high degree of safety, a system that provides a very high degree of availability, etc. The configuration can be accomplished during an initial system configuration at design time. Additionally or alternatively, the configuration can be dynamically adjusted based on real time events associated with the industrial automation environment, machine, process, etc. As opposed to conventional systems that provide safety and/or availability by way of a hard coded, manufacturer pre-defined voting scheme, the claimed subject matter enables customization of a voting configuration that can be tailored to a particular industrial automation environment, device(s), process(es), etc.

In accordance with various aspects of the claimed subject matter, an optimization component can generate a voting configuration that can allocate available redundancy to provide an optimized combination of safety and availability. For instance, the optimization component can determine the voting configuration based upon input data that can be obtained (e.g., from an industrial automation device, a user, . . . ). The optimization component can generate a voting configuration that provides for any combination of safety and availability by configuring the available redundancy. Additionally or alternatively, an amount of available redundancy can vary (e.g., by adding or removing industrial automation devices, by utilizing a remote provider of redundancy, . . . ). Further, it is to be appreciated that the optimization component can be a stand alone component, included as part of one or more industrial automation devices, provided remotely, a combination thereof, etc. The optimization component can further consider voting configurations that mitigate effects associated with common mode failure.

Pursuant to one or more aspects of the claimed subject matter, a voting configuration can be employed in connection with combining outputs, votes, measurements, etc. from various industrial automation devices. For instance, the voting configuration can provide an approach for addressing faults. Additionally, the industrial automation devices can be monitored to detect failures and/or adequate responses to failures can be yielded. According to an example, upon an occurrence of a fault, a voting configuration providing a high level of safety can be utilized to halt a machine and/or process. Pursuant to another illustration, a disparate voting configuration that yields a high degree of availability can provide fault tolerance such that operations can continue (e.g., at an original level, a degraded level, . . . ); however, it is to be appreciated that the claimed subject matter is not limited to the aforementioned examples.

To the accomplishment of the foregoing and related ends, certain illustrative aspects of the claimed subject matter are described herein in connection with the following description and the annexed drawings. These aspects are indicative, however, of but a few of the various ways in which the principles of such matter can be employed and the claimed subject matter is intended to include all such aspects and their equivalents. Other advantages and novel features will become apparent from the following detailed description when considered in conjunction with the drawings.

DETAILED DESCRIPTION

Figure 1:
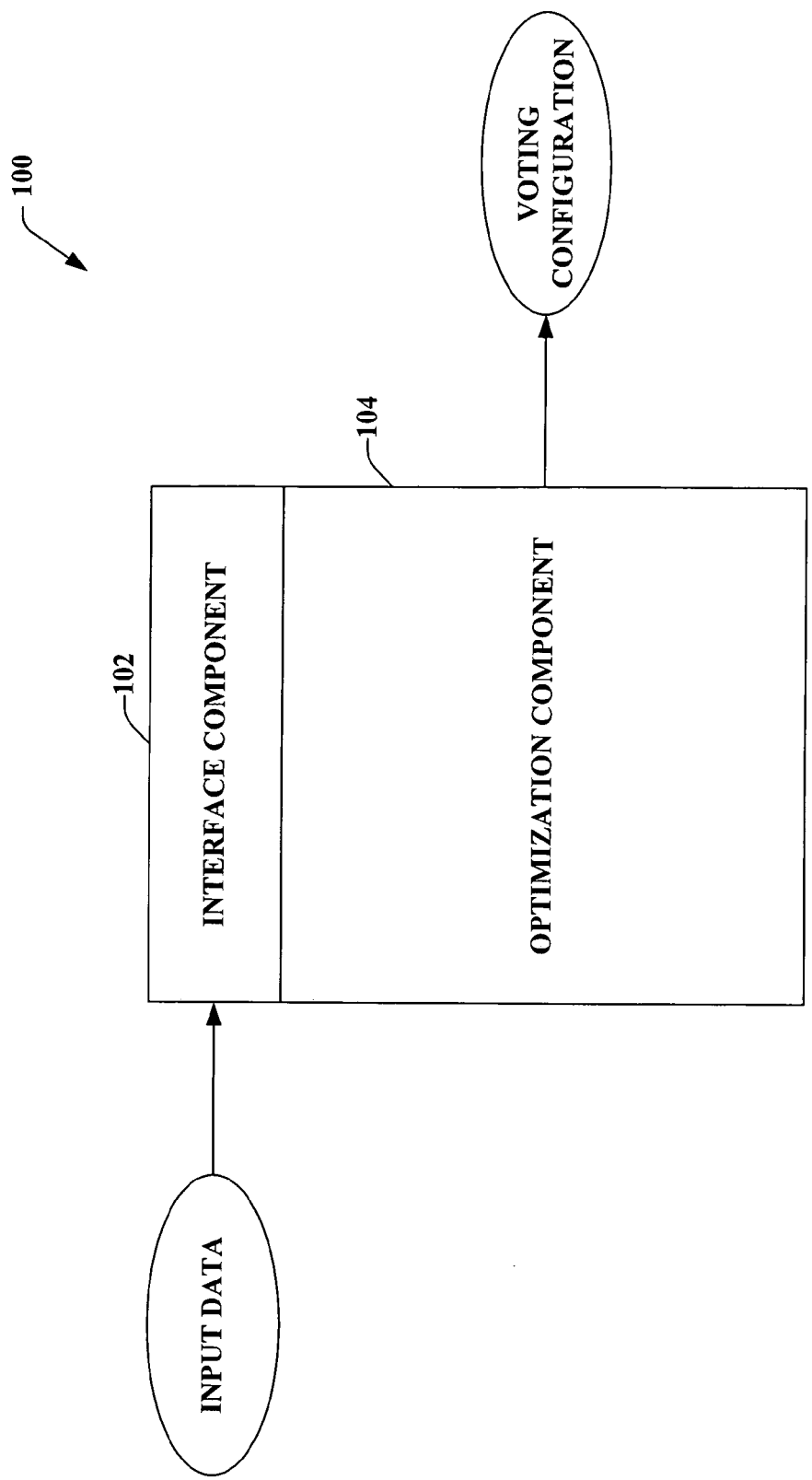
FIG. 1 illustrates a block diagram of an exemplary system that enables optimizing availability and/or safety within an industrial automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the subject innovation.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that enables optimizing availability and/or safety within an industrial automation environment. The system 100 can include an interface component 102 that obtains input data and an optimization component 104 that evaluates the input data to generate a voting configuration. The interface component 102 can receive the input data from any source. For instance, the interface component 102 can obtain the input data from one or more industrial automation devices. The industrial automation device(s) (not shown) can be an input device (e.g., sensor, . . . ), a logic solving device (e.g., programmable logic controller (PLC), . . . ), an output device (e.g., actuator, cylinder, diaphragm, relay, solenoid, motor controller, robot, servo motion device, . . . ), etc. Additionally or alternatively, the interface component 102 can obtain input data from a user.

The input data can include information that can be utilized to configure and/or adjust a voting configuration. According to an example, the input data can be a measured property associated with the industrial automation environment, a monitored condition related to a particular machine and/or process within the industrial automation environment, etc. Further, the input data can relate to characteristics associated with the industrial automation devices (e.g., age, accuracy, location, history, status, . . . ). By way of example, the input data can be related to a risk of failure associated with the industrial automation device (e.g., a number of previous failures associated with the particular device, . . . ). According to another illustration, the input data can be associated with an amount of harm associated with a failure of the industrial automation device (e.g., damage caused to a person and/or property, downtime, . . . ). It is to be appreciated that any suitable input data can be utilized including, but not limited to, prognostic data, diagnostic data, feedback data, feed forward data, data from a network, data from a hardwire connection, data associated with a complex network interface, etc. Pursuant to another illustration, the input data can be provided by a user (e.g., user input to effectuate adjusting utilization of available redundancy, . . . ); thus, for instance, the user can facilitate altering the voting configuration to provide increased safety, availability, etc.

As described above, the optimization component 104 can evaluate the input data to generate a voting configuration. By way of example, the input data can include an indication of an amount of available redundancy. Additionally or alternatively, the optimization component 104 can identify an amount of available redundancy (e.g., from the input data). According to an illustration, the available redundancy can be related to a machine, a process, an environment, a combination thereof, etc. The optimization component 104 can thereafter configure a voting scheme that utilizes the redundancy. The optimization component 104 can yield a voting configuration that provides for safety, availability, a combination thereof, etc. Accordingly, the optimization component 104 can evaluate the input data to determine how to allocate the available redundancy to provide for an optimized amount of safety and/or availability. Thus, as opposed to conventional safety and availability systems where a voting scheme can be hard coded and pre-defined by a manufacturer of a component, the optimization component 104 can enable the voting configuration to be initially configured for an industrial automation environment depending upon available resources, dynamically reconfigured based on observed events, etc.

The voting configuration generated by the optimization component 104 can be employed by a disparate component (not shown) to enable combining outputs provided by N industrial automation devices, where N is any positive integer. Additionally or alternatively, the N industrial automation devices can utilize the voting configuration to generate a combined output. According to a further illustration, a set of operating limits (e.g., related to a machine, process, . . . ) can be generated based upon the voting configuration (e.g., utilizing the optimization component 104, a disparate component (not shown), . . . ). By way of illustration, the optimization component 104 can generate a voting configuration that relates to combining outputs from three controllers. The voting configuration can be utilized to regulate the combination such that if any of the three controllers outputs a fault, then an associated machine and/or process will stop operation; such a voting configuration can yield a high level of safety since the controllers not providing the fault can be employed to discontinue operation and/or because the machine and/or process can be non-operational while the fault exists. Additionally or alternatively, the voting configuration can be utilized to combine the outputs from the three controllers such that if one or more of the controllers does not provide a fault, then the machine and/or process can be operational and thus provide a high degree of availability since the machine and/or process can run while a controller yields a fault. According to another illustration, the voting configuration can utilize a two out of three voting scheme such that if two or more of the controllers do not provide a fault, then the associated machine and/or process can continue without being halted. It is to be appreciated that the claimed subject matter is not limited to the aforementioned examples and any voting configuration is contemplated.

Although the interface component 102 is depicted as being separate from the optimization component 104, it is contemplated that the optimization component 104 can include the interface component 102 or a portion thereof. Also, the interface component 102 can provide various adapters, connectors, channels, communication paths, etc. to enable interaction with the optimization component 104. Additionally, it is to be appreciated that the interface component 102 and/or the optimization component 104 can be included in one or more industrial automation devices, stand alone components, a combination thereof, etc. According to an example, any number of optimization components (e.g., each associated with disparate industrial automation devices, . . . ) can be employed together to yield a voting configuration. Pursuant to this example, the disparate optimization components can communicate with each other to yield a voting configuration. In accordance with a further illustration, the optimization component 104 can be provided remotely.

Figure 2:
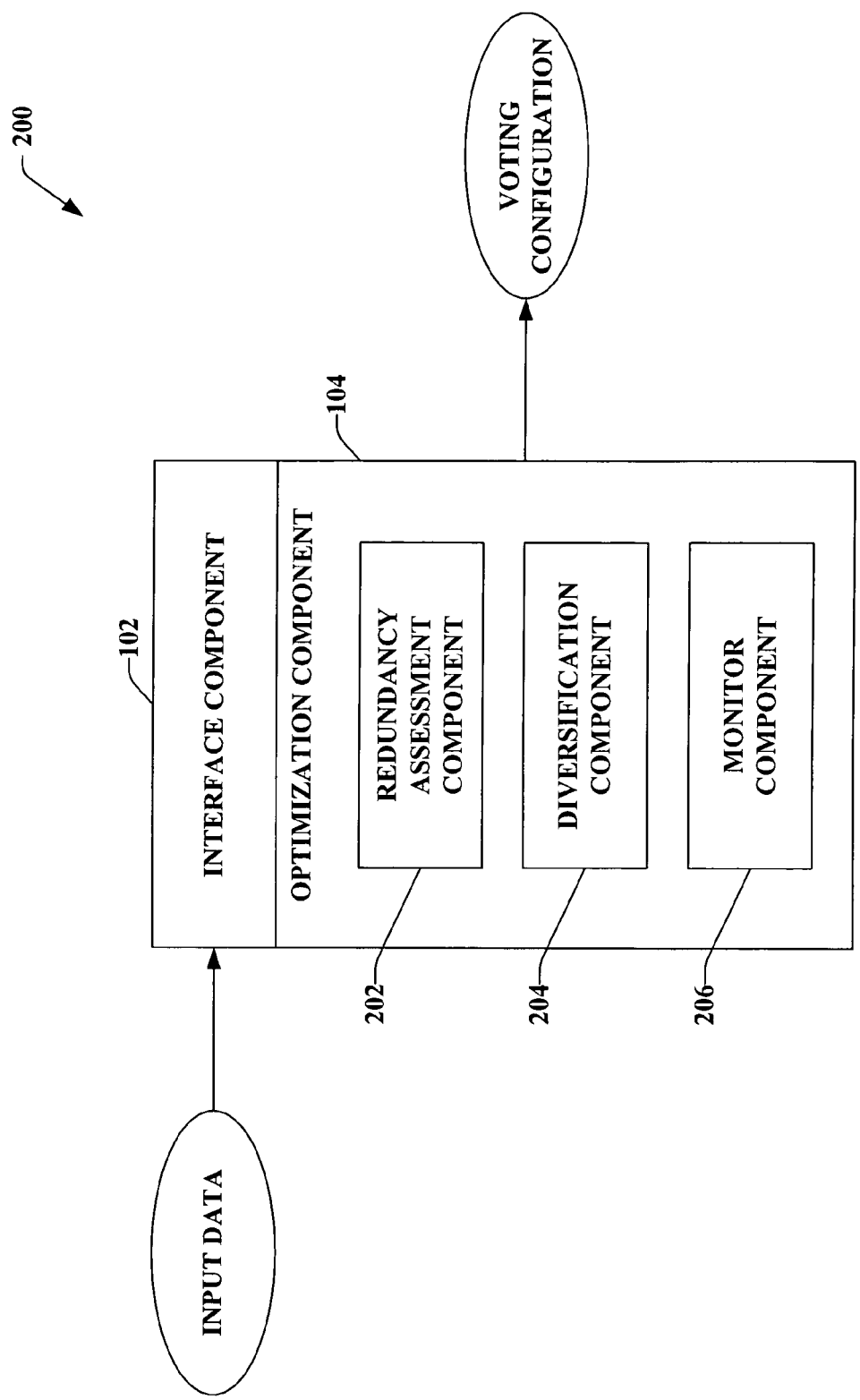
FIG. 2 illustrates a block diagram of an exemplary system that enables generating a voting configuration for utilization in an industrial automation environment.

Turning to FIG. 2, illustrated is a system 200 that enables generating a voting configuration for utilization in an industrial automation environment. The system 200 includes the interface component 102, which receives input data, and the optimization component 104 that can yield a voting configuration based at least in part upon the input data. The optimization component 104 can further comprise a redundancy assessment component 202, a diversification component 204, and/or a monitor component 206, any of which can be employed in connection with generating the voting configuration.

The redundancy assessment component 202 can evaluate resources associated with an industrial automation environment, a machine, a process, etc. and determine an amount of available redundancy. For instance, the redundancy assessment component 202 can determine a number of available industrial automation devices. The redundancy assessment component 202 can further identify characteristics associated with the industrial automation devices. Thus, by way of example, the redundancy assessment component 202 can determine that four PLCs within the industrial automation environment can be utilized with a particular motor; however, the claimed subject matter is not so limited. Pursuant to a further illustration, the redundancy assessment component 202 can be utilized in connection with initializing the industrial automation environment such that the input data can include information provided at setup related to redundancy. Thus, for instance, upon adding and/or removing an industrial automation device, input data related to the device (e.g., location, history, status, association with disparate devices and/or machines and/or processes, . . . ) can be provided to the redundancy assessment component 202 (e.g., by way of the interface component 102). It is to be appreciated that such information can be provided automatically upon adding and/or removing the industrial automation device, by a user, etc. According to an example, the redundancy assessment component 202 can thereafter store the input data related to the available redundancy (e.g., utilizing a data store (not shown), . . . ); however, the subject claims are not so limited.

The optimization component 104 can additionally include the diversification component 204, which can mitigate common mode failures. The optimization component 104 can employ the diversification component 204 to analyze a likelihood of an occurrence of common mode failure. The diversification component 204 can also evaluate probabilities of common mode failure associated with various voting configurations utilizing the available redundancy as determined by the redundancy assessment component 202. Thereafter, the optimization component 104 can generate the voting configuration based at least in part upon the results yielded by the diversification component 204 to mitigate occurrences of common mode failures.

The optimization component 104 can also employ the monitor component 206 to detect failures and/or provide appropriate responses to such failures. The monitor component 206 can identify any type of failure associated with an industrial automation device. Further, the monitor component 206 can detect any degradation associated with the industrial automation device. Although depicted as part of the optimization component 104, it is to be appreciated that the monitor component 206 can be included in an industrial automation device, a stand alone component, etc. Thus, for instance, the monitor component 206 can facilitate transmitting a fault (e.g., as part of the input data) to the interface component 102, which can thereafter be employed by the optimization component 104 (e.g., to adjust the voting configuration) and/or in connection with combining data in accordance with the voting configuration.

Moreover, the monitor component 206 can effectuate a response to an identified failure. For instance, if the monitor component 206 identifies a failure associated with a particular PLC, then the monitor component 206 can stop operation associated with the identified fault, permit further operation, allow for continued operation at a degraded level (e.g., reduced speed, torque, human exposure, . . . ), etc. According to another example, when the monitor component 206 determines that an industrial automation device is associated with a failure, the voting configuration can be employed to determine an appropriate response. Thus, by way of illustration, if the voting configuration provides for a high level of safety, the failure of one device can lead to stopping operation of an associated machine (e.g., halting operation of a pump based on an associated PLC generating a fault, . . . ); additionally, if a high level of availability is specified by the voting configuration, the associated machine and/or process can continue operation even though one of the industrial automation devices provides a fault.

Figure 3:
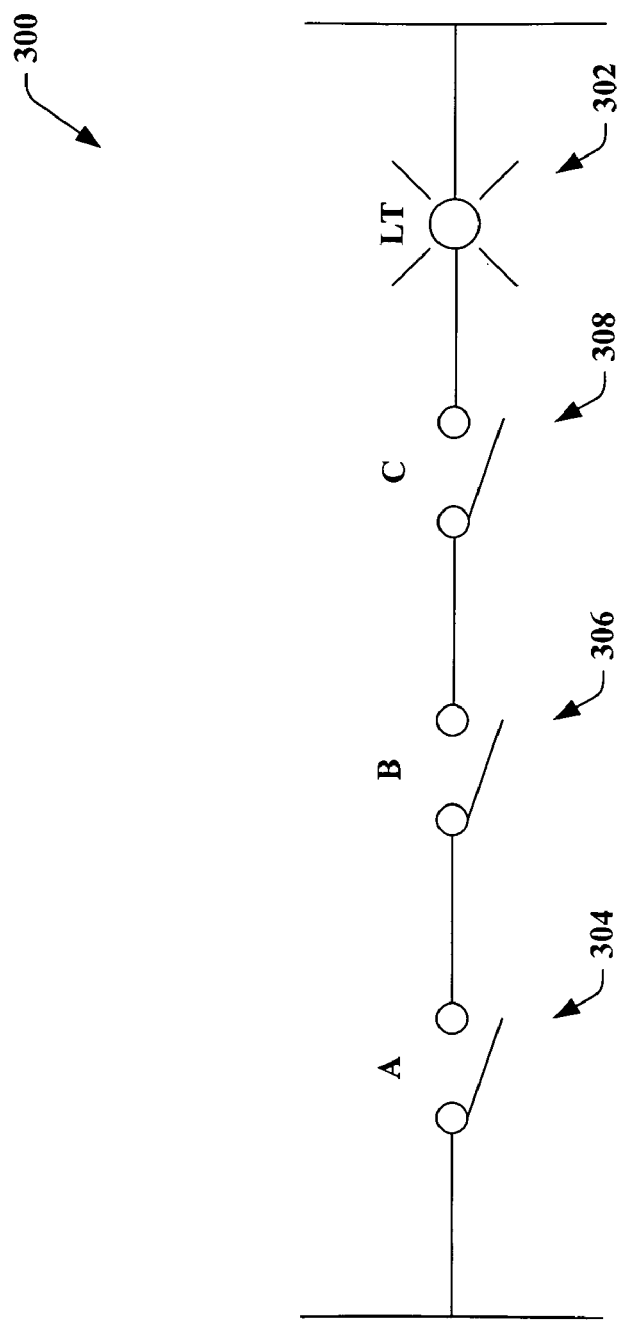
FIGS. 3-5 illustrate exemplary schematic diagrams illustrating various voting configurations.
Figure 4:
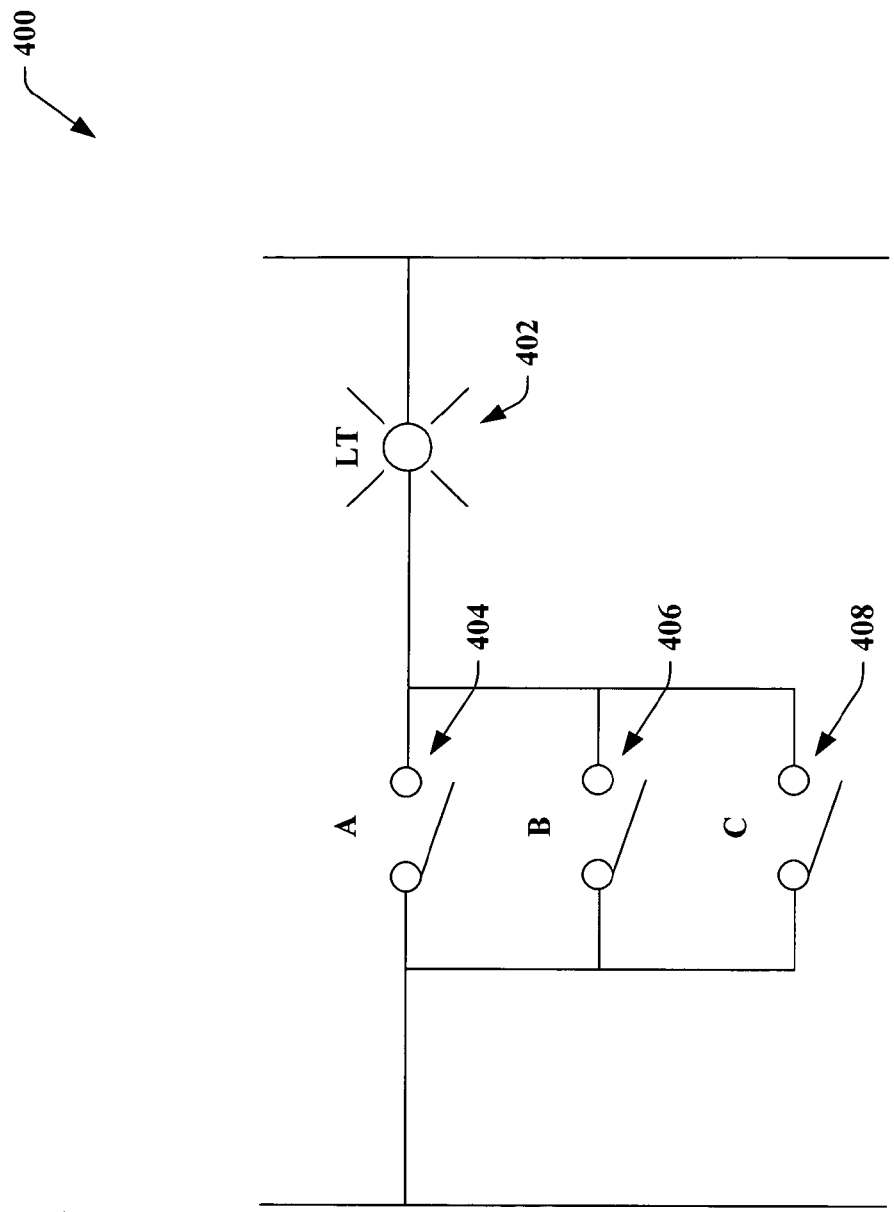
Figure 5:
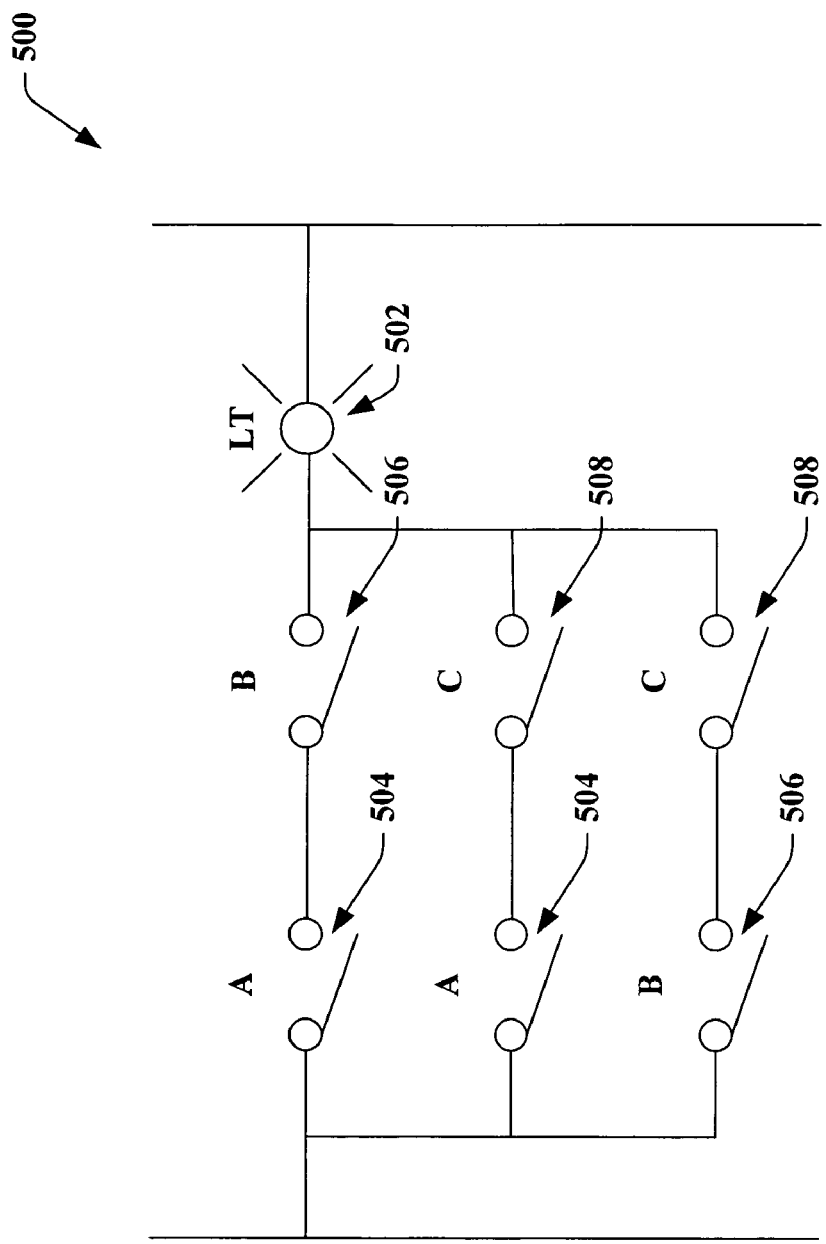

With reference to FIGS. 3-5, illustrated are exemplary schematic diagrams illustrating various voting configurations. It is to be appreciated that these illustrations are provided as examples and the claimed subject matter is not so limited since utilization of any type, number, configuration, etc. of industrial automation devices and/or voting configurations is contemplated. Depicted in each exemplary schematic diagram are a light ("LT") and three switches (A, B, and C) configured in various manners to provide different voting in connection with operating the light. Thus, the switches can provide redundancy that can be configured (e.g., utilizing the optimization component 104 of FIG. 1) to implement safety systems, availability systems, safety systems with high availability, availability systems that can perform a safe function, etc. The voting configuration can therefore facilitate providing disparate responses to failures associated with one or more of the switches.

Turning to FIG. 3, illustrated is an exemplary schematic diagram 300 depicting a voting configuration that provides a high level of safety (e.g., safety system). In this example, the voting configuration facilitates ensuring that an operator can turn off a light 302. Three switches (switch A 304, switch B 306, and switch C 308) can be configured to vote in series, thereby enabling any one of the switches to turn off the light 302. By way of illustration, if switch A 304 fails to turn off the light 302 as a result of a failure related to the switch A 304, the voting configuration provides that the second switch B 306 and/or the third switch C 308 can be activated and can turn off the light 302. Thus, the redundancy can ensure the system function (e.g., enabling the light 302 to be turned off). Additionally or alternatively, upon detecting a fault (e.g., fault associated with the switch A 304, the switch B 306, and/or the switch C 308), the voting configuration can prohibit the light 302 from being re-energized until the fault has been corrected. Pursuant to an example, a monitor component (e.g., the monitor component 206 of FIG. 2) can evaluate the switches (the switch A 304, the switch B 306, and the switch C 308) and identify any faults associated therewith; in the event a fault is located, the light 302 can be inhibited from operation (e.g., based upon the voting configuration).

With reference to FIG. 4, illustrated is an exemplary schematic diagram 400 that shows a voting configuration that provides a high level of availability (e.g., availability system). According to this illustration, a light 402 can be controlled by three switches (switch A 404, switch B 406, and switch C 408) that can vote in parallel; thus, the votes from the switches can be combined with an OR operator. Utilization of this voting configuration can enable the light 402 to remain operational even if a failure associated with one or two of the switches occurs (e.g., fails to turn on, . . . ). Thus, in the event of a fault, the system can continue operating by employing such a voting configuration.

Turning to FIG. 5, illustrated is an exemplary schematic diagram 500 that depicts a high availability safety system. Accordingly, operation of a light 502 can be controlled by utilizing three switches (switch A 504, switch B 506, and switch C 508). The switches can be configured to vote employing a two out of three scheme. Thus, a certain level of safety can be provided, while not shutting down the system upon detecting a fault; rather, the system can continue to run without compromising the safety function so long as two switches have not provided faults.

Figure 6:
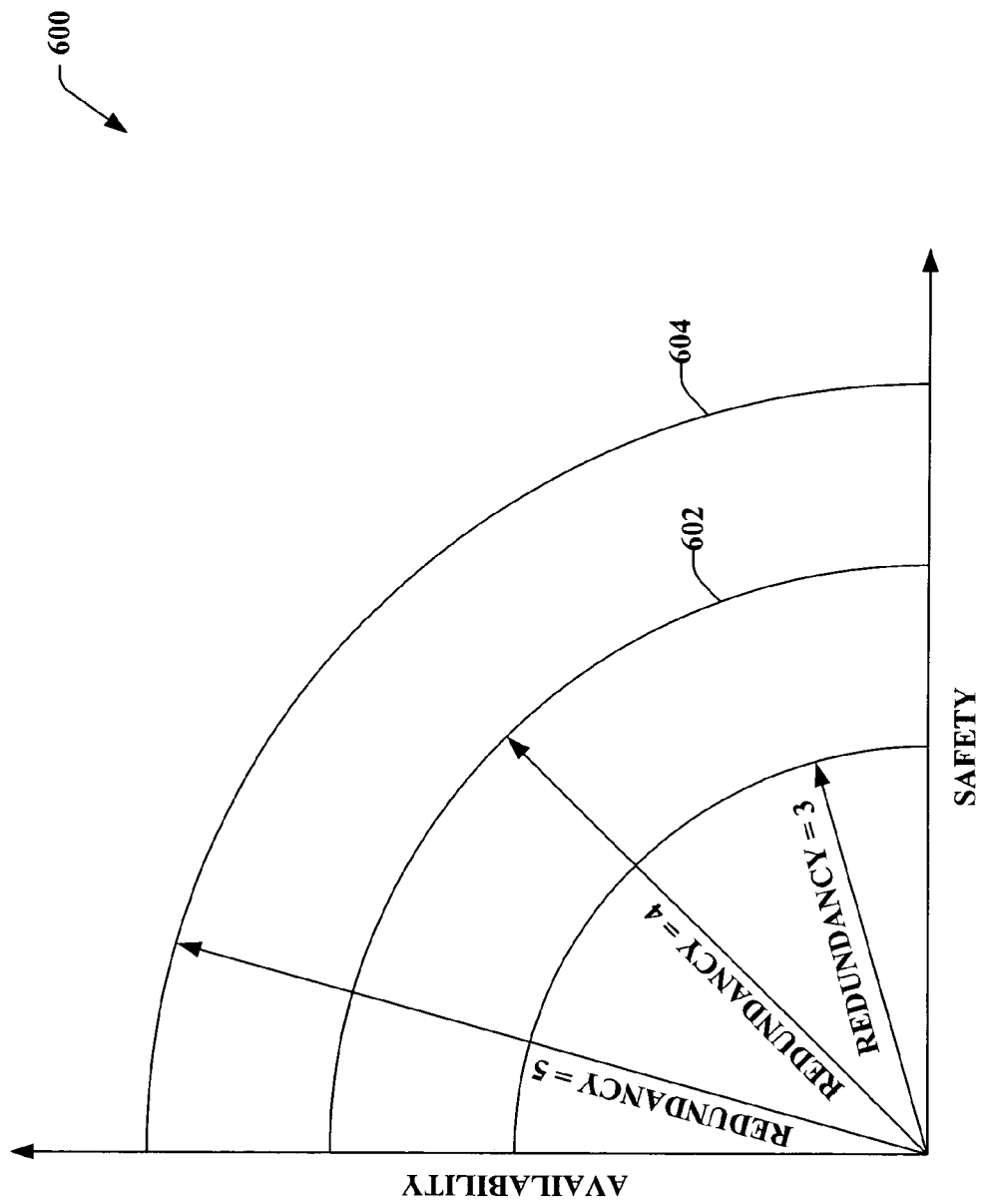
FIG. 6 illustrates an exemplary diagram depicting allocation of various amounts of redundancy.

With reference to FIG. 6, illustrated is an exemplary diagram 600 depicting allocation of various amounts of redundancy. As illustrated, a system can configure and/or be configured to implement varying combinations of availability and/or safety depending upon an amount of available redundancy. Thus, for instance, if the amount of redundancy equals four, a voting configuration can be generated (e.g., by way of employing the optimization component 104 of FIG. 1) that apportions the safety and/or availability anywhere along an associated arc (e.g., arc 602). Additionally or alternatively, the voting configuration can be dynamically modified to provide for any combination of safety and availability along the arc corresponding to the amount of available redundancy (e.g., arc 602). Further, to implement a disparate combination of safety and/or availability that lies upon a different arc (e.g., arc 604), additional redundancy can be added (e.g., raising the total redundancy to be equal to five).

Figure 7:
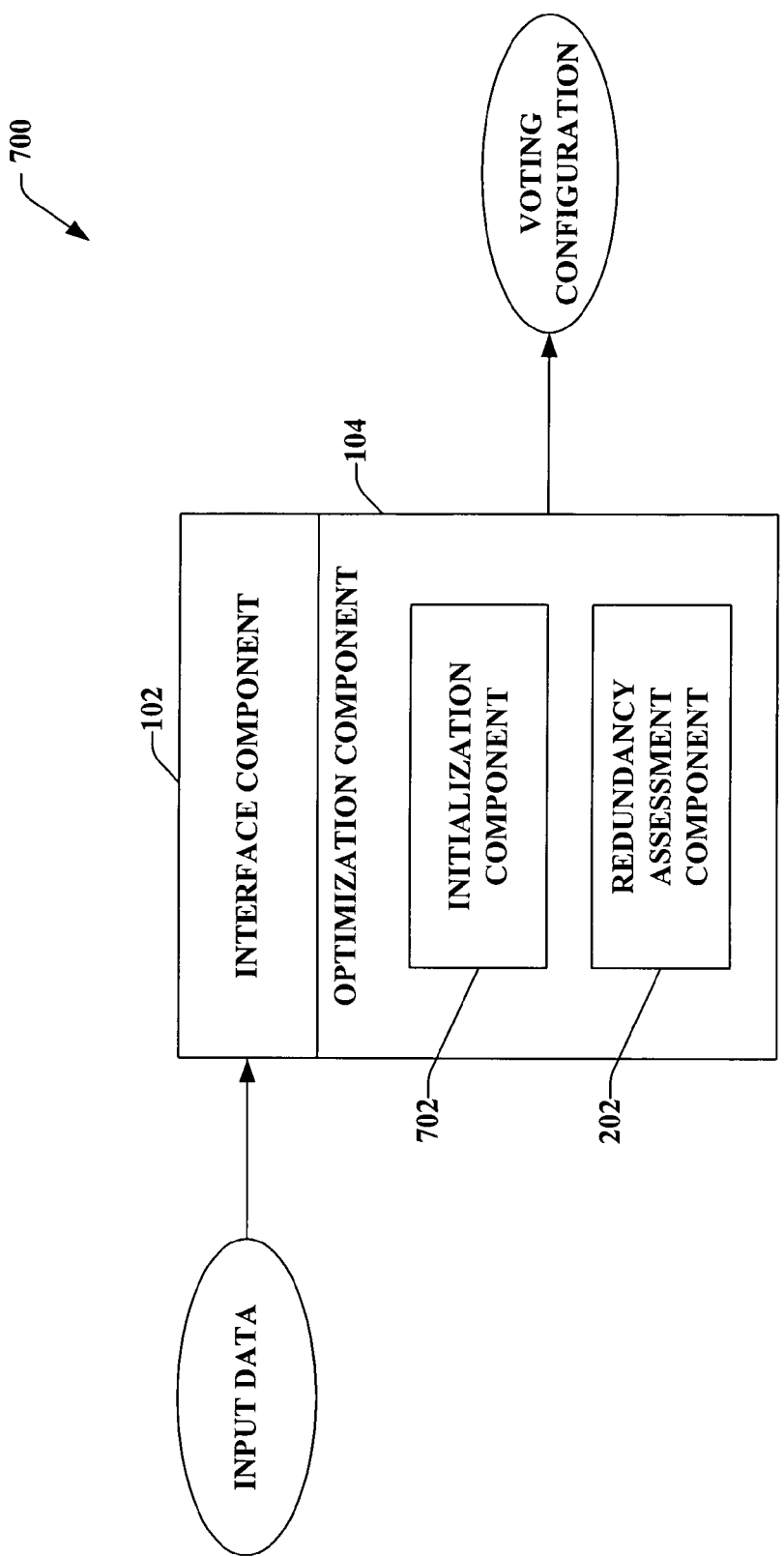
FIG. 7 illustrates a block diagram of an exemplary system that initializes voting associated with multiple, redundant decision makers in an industrial automation environment to provide fault tolerance.

Turning to FIG. 7, illustrated is a system 700 that initializes voting associated with multiple, redundant decision makers in an industrial automation environment to provide fault tolerance. The system 700 includes the interface component 102 that receives input data and the optimization component 104, which can further comprise the redundancy assessment component 202. The optimization component 104 can additionally include an initialization component 702 that can enable generating an initial voting configuration for the multiple, redundant decision makers (e.g., industrial automation devices) (not shown).

Any number of decision makers can be included within the industrial automation environment. Each of these decision makers can be a standard product that need not be preconfigured. Accordingly, when the decision makers are incorporated into the industrial automation environment, the redundancy assessment component 202 can be utilized to determine an available amount of redundancy (e.g., by way of sending signals to the decision makers within the environment, receiving information as part of the input data, . . . ). Moreover, the initialization component 702 can employ the identified amount of redundancy to generate a voting configuration at a time of setup of the environment. The initialization component 702 can also consider disparate factors in connection with yielding the voting configuration. For instance, the initialization component 702 can evaluate a user profile, a likelihood of fault occurring, harm associated with a fault, user input, etc. when determining an optimized balance between availability and safety. Upon determining the balance, the initialization component 702 (and/or the optimization component 104) can generate the voting configuration.

Figure 8:
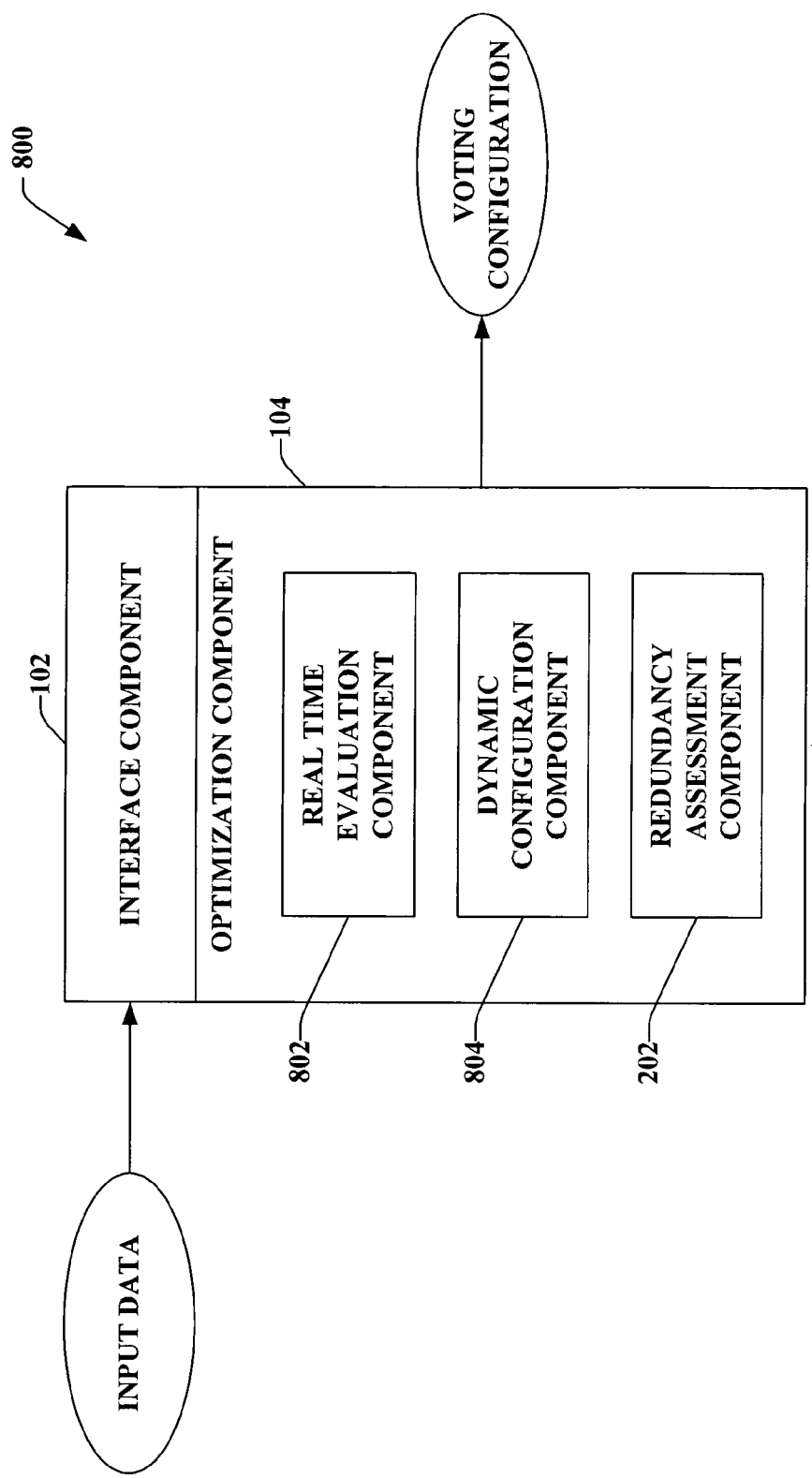
FIG. 8 illustrates a block diagram of an exemplary system that dynamically reconfigures voting in an industrial automation environment.

FIG. 8 illustrates a system 800 that dynamically reconfigures voting in an industrial automation environment. The system 800 can include the interface component 102 that can obtain input data. Additionally, the system 800 can comprise the optimization component 104 that generates a voting configuration based at least in part on the input data. To enable yielding the voting configuration, the optimization component 104 can include the redundancy assessment component 202 that can determine the available redundancy. Further, the optimization component 104 can comprise a real time evaluation component 802 and/or a dynamic configuration component 804.

The real time evaluation component 802 can monitor real time events associated with the industrial automation environment. The real time evaluation component 802 can, for example, evaluate a level of risk and/or a level of availability of a system or process at a particular time. The results obtained by the real time evaluation component 802 can be employed by the dynamic configuration component 804 to adjust utilization of the available redundancy; for instance, the dynamic configuration component 804 can enable generating an updated voting configuration. By way of example, the real time evaluation component 802 can determine that a worker is proximate to a motor. Thereafter, the dynamic configuration component 804 can yield a voting configuration that provides for more safety and a lesser amount of availability by way of adjusting utilization of the available redundancy; however, the claimed subject matter is not so limited.

The dynamic configuration component 804 (and/or the optimization component 104 and/or the initialization component 702 of FIG. 7) can utilize a rule set that can indicate a response (e.g., change in voting configuration) to a monitored event. Any type of monitored event can be associated with a corresponding voting configuration adjustment. It is to be appreciated that the rule set can be stored in a data store (not shown). Additionally, the rule set can be predefined and/or can vary depending upon historical data. By way of example, the rule set can provide for shifting the allocation of the redundancy after a large failure that caused injury to provide for a very high level of safety while reducing the level of availability; however, the claimed subject matter is not so limited.

According to a further illustration, the real time evaluation component 802 can examine integrity, health, and credibility of data from industrial automation devices (e.g., sensor, logic solver, actuator, . . . ). The dynamic configuration component 804 can employ the information obtained by the real time evaluation component 802 to adjust a voting configuration. Pursuant to an example, the dynamic configuration component 804 can employ weighting factors to determine the integrity, health and/or credibility of the industrial automation devices. It is to be appreciated that the claimed subject matter is not limited to the aforementioned examples.

Figure 9:
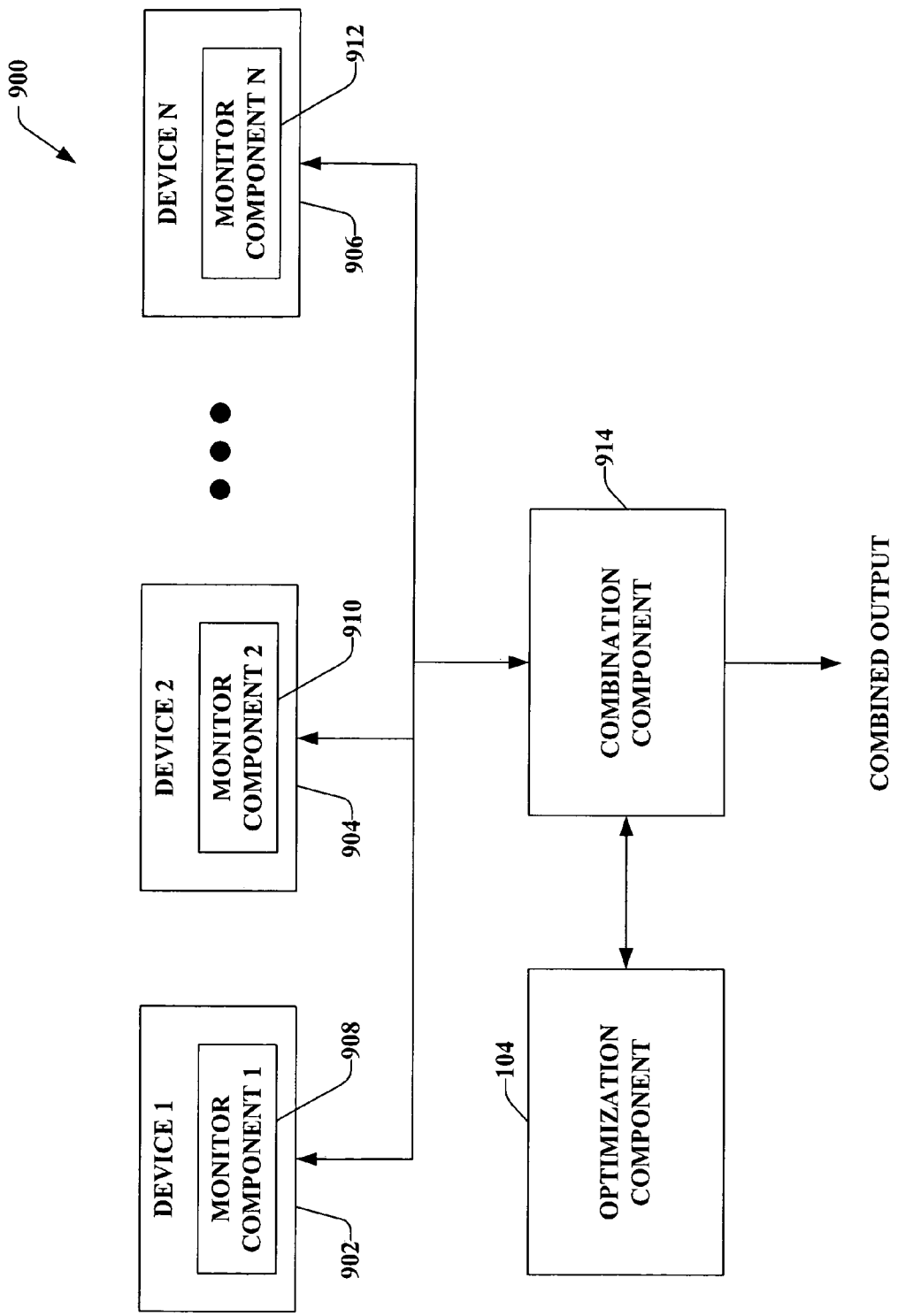
FIG. 9 illustrates a block diagram of an exemplary system that utilizes a voting configuration to implement an optimized utilization of available redundancy.

Referring to FIG. 9, illustrated is a system 900 that utilizes a voting configuration to implement an optimized utilization of available redundancy. The system 900 includes an optimization component 104 that can generate a voting configuration. For instance, the voting configuration can be provided by the optimization component 104 at a time of initialization of the system 900, dynamically generated during operation of the system 900, etc. The system 900 additionally can include N devices (e.g., device 1 902, device 2 904 . . . device N 906), where N is any positive integer. It is contemplated that the N devices 902-906 can be any type of industrial automation device. By way of example, the N devices 902-906 can be input devices (e.g., sensor, . . . ), logic solving devices (e.g., programmable logic controller (PLC), . . . ), output devices (e.g., actuator, cylinder, diaphragm, relay, solenoid, motor controller, robot, servo motion device, . . . ), etc. Additionally, the N devices 902-906 can provide redundancy that can be configured to implement safety, availability, or a combination thereof.

The N devices 902-906 can comprise respective monitor components (e.g., monitor component 1 908, monitor component 2 910 . . . monitor component N 912). Each of the monitor components 908-912 can be utilized to detect failures associated with a corresponding device (e.g., one of the N devices 902-906). Upon detecting a fault associated with a particular one of the devices 902-906, data can be provided to a combination component 914 that can assemble information in accordance with the voting configuration. Additionally or alternatively, the devices 902-906 can provide any type of output (e.g., in addition to or in place of fault related data identified by the monitor components 908-912) to the combination component 914, which can harmonize the data to yield a combined output. It is contemplated that the combined output can be utilized in any manner. For instance, the combined output can be provided back to the devices 902-906 (e.g., to enable halting operation, continuing operation, modifying operation such as by reducing speed, torque, human exposure, . . . ). According to another example, the combined output can be employed by the optimization component 104 to facilitate generating an updated voting configuration.

Although depicted as included within the devices 902-906, it is contemplated that the monitor components 908-912 can be stand alone components. Additionally or alternatively, one monitor component can be utilized to evaluate the devices 902-906. According to this example, the monitor component can be included as part of the optimization component 104, the combination component 914, a combination thereof, a stand alone component, etc. Further, although the combination component 914 is illustrated as a separate component, it is contemplated that the devices 902-906 can be associated with corresponding combination components that can enable the devices to harmonize outputs in accordance with a voting configuration.

Pursuant to a further illustration, the combination component 914 can utilize the voting configuration along with weights related to each of the devices 902-906. For instance, the weights can be associated with the ability of each of the devices 902-906 to provide accurate data to the combination component 914. The weights relating to each of the devices 902-906 can be based at least in part upon a mean time between failures (MTBF), an age, a status, input sensors, history, and/or any associated characteristic, for example.

By way of illustration, one of the devices 902-906 can output a fault (e.g., as identified by the associated one of the monitor components 908-912). The combination component 914 can provide for fault tolerance by utilizing a voting configuration provided by the optimization component 104 that enables continued operation when one of the devices 902-906 generates a fault while at the same time providing safety, for instance. Additionally or alternatively, it is contemplated that when one of the devices 902-906 yields a fault, operation can be at an original level, at a degraded level utilizing disparate system controlled measures such as, for example, reduced speed, torque, human exposure, etc.

Figure 10:
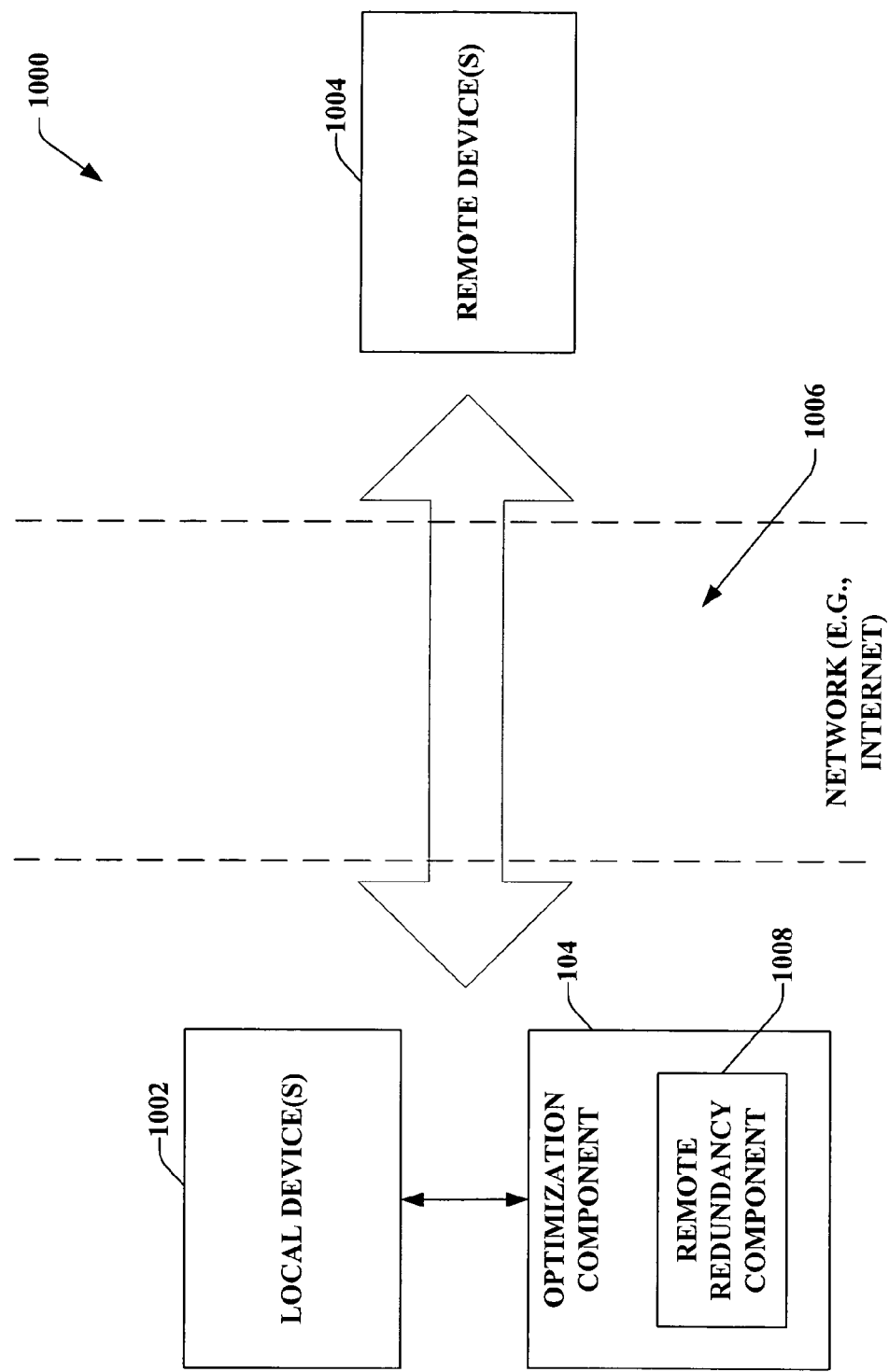
FIG. 10 illustrates a block diagram of an exemplary system that enables adding and/or removing redundancy from an industrial automation environment.

With reference to FIG. 10, illustrated is a system 1000 that enables adding and/or removing redundancy from an industrial automation environment. The system 1000 includes an optimization component 104 that can generate a voting configuration based on an available amount of redundancy. For example, the optimization component 104 can provide a voting configuration based on the redundancy associated with local device(s) 1002, which can be any industrial automation devices. The local device(s) 1002 can be, for instance, the devices that are located at a plant, utilized by a company, etc. If more redundancy is desired to provide increased safety and/or availability (e.g., shifting to a disparate arc as shown in FIG. 6), additional redundancy can be provided by remote device(s) 1004 (e.g., logic solvers, sensors, any industrial automation device, . . . ) which can be accessible via a network 1006 (e.g., the Internet).

The optimization component 104 can include a remote redundancy component 1008 that can order, recognize, configure, employ, etc. additional redundancy provided by the remote device(s) 1004. By way of example, the remote device(s) 1004 can be supported by a third party provider and can enable increasing an amount of available redundancy. Thus, for instance, the additional redundancy can be provided on a short term basis, on a startup basis, as a cost effective alternative to buying additional hardware to implement added redundancy, etc. According to an illustration, it can be determined that additional redundancy is desired to provide enhanced safety and/or availability. Thus, the remote redundancy component 1008 can initiate adding such redundancy by communicating with a service provider that hosts the remote device(s) 1004 by way of the network 1006. The remote redundancy component 1008 can negotiate a type of device, cost, amount of redundancy, period of time, etc. with respect to which the remote device(s) 1004 can be employed in connection with the local device(s) 1002 to provide additional redundancy. Thereafter, the optimization component 104 can generate an updated voting configuration that accounts for the added redundancy. Additionally or alternatively, upon discontinuing utilization of the remote device(s) 1004, the optimization component 104 and/or the remote redundancy component 1008 can generate an updated voting configuration. Thus, utilization of the remote device(s) 1004 enables expanding an amount of available redundancy associated with an industrial automation environment. Although depicted as coupled to the local device(s) 1002, it is to be appreciated that the optimization component 104 can additionally or alternatively be provided remotely. Pursuant to an example, the optimization component 104 can be located at a remote location (e.g., hosted by a third party provider) and can generate a voting configuration based at least in part upon an amount of available redundancy associated with the local device(s) 1002 and/or any additional redundancy yielded by the remote device(s) 1004; however, the claimed subject matter is not so limited.

Figure 11:
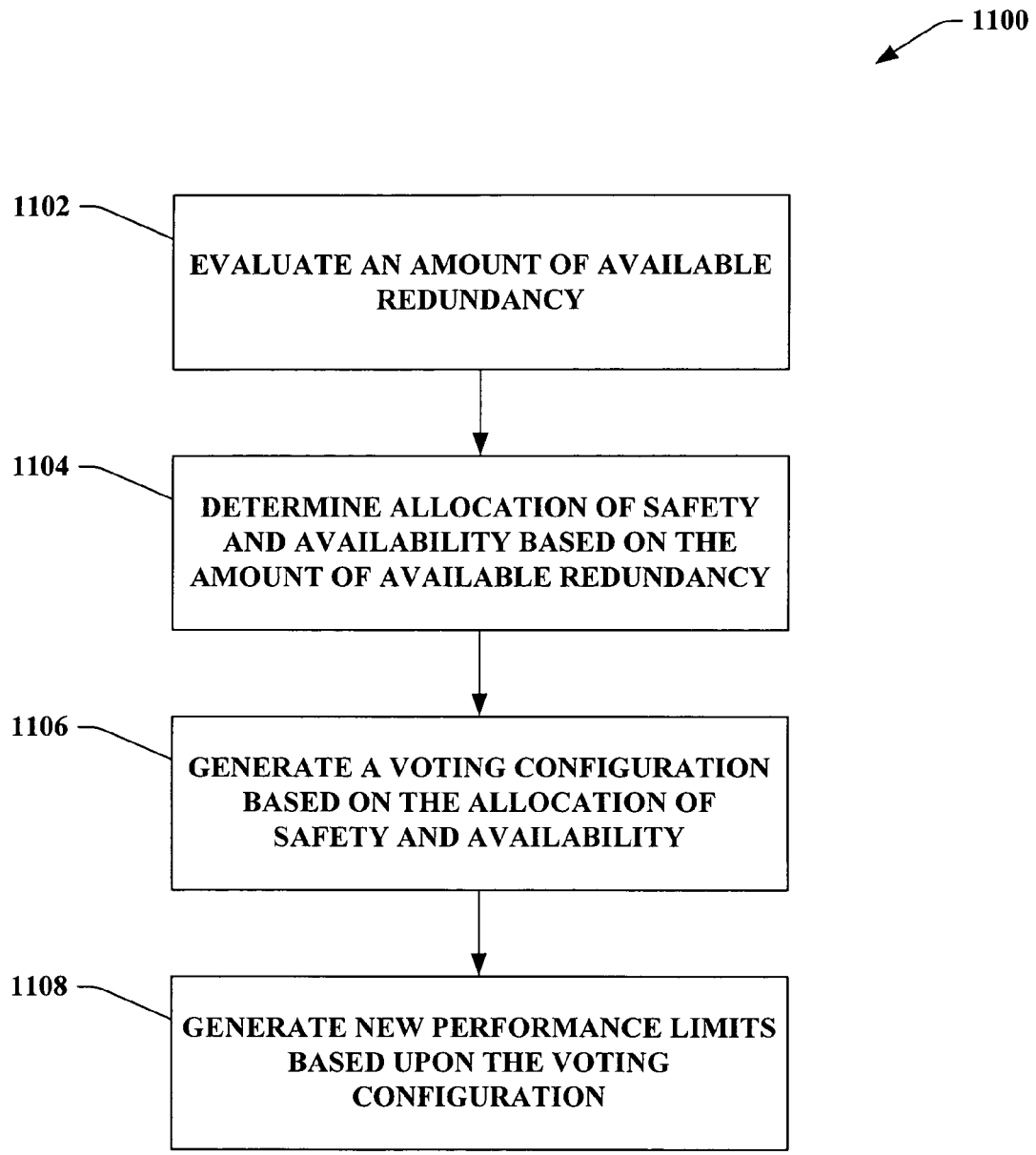
FIG. 11 is a representative flow diagram of a methodology that facilitates optimizing utilization of redundancy in an industrial automation environment.
Figure 12:
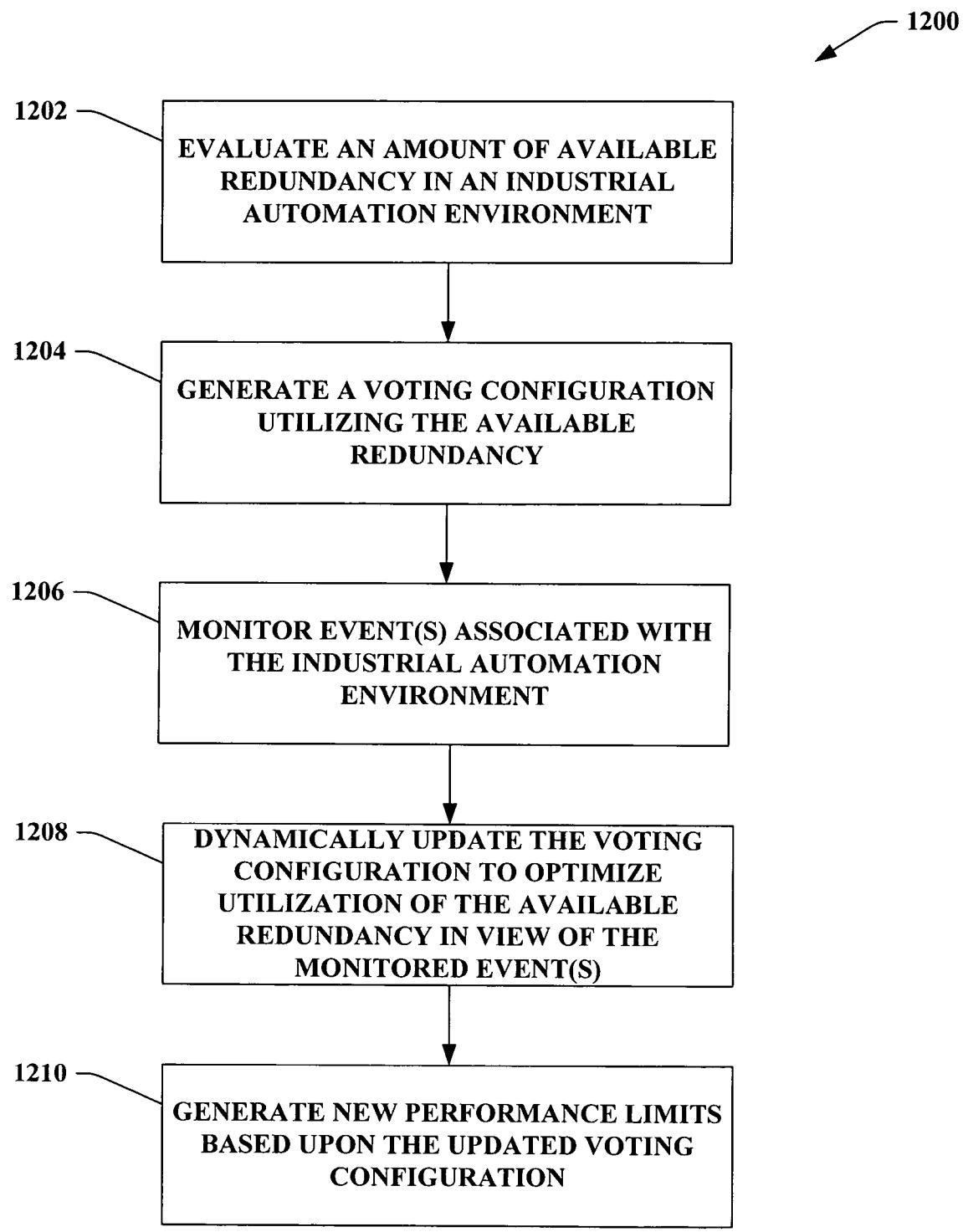
FIG. 12 is a representative flow diagram of a methodology that facilitates updating utilization of available redundancy in an industrial automation environment.

Referring to FIGS. 11-12, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 11, illustrated is a methodology 1100 that facilitates optimizing utilization of redundancy in an industrial automation environment. At 1102, an evaluation can be effectuated to determine an amount of available redundancy. For example, a determination can be made related to a number of industrial automation devices (e.g., logic solvers, sensors, . . . ) included in the environment, locations of the devices, status of the devices, associations between devices, etc. At 1104, an allocation of safety and/or availability can be determined based at least in part upon the amount of available redundancy. By way of example, a determination can be reached that can indicate that the allocation should provide for as much safety as possible given the amount of redundancy, as much availability as possible in view of the amount of redundancy, and/or some combination of safety and availability. The allocation between safety and availability can be identified, for instance, based on characteristic(s) associated with the industrial automation environment and/or a device, machine, process, etc. within the environment. Pursuant to an example, if a high level of risk of damage or injury exists, then the allocation can provide for a higher degree of safety as compared to availability. Meanwhile, if it is determined that downtime is associated with significant costs while the risk of damage and/or injury is not as great, then the redundancy can be allocated to provide a higher level of availability while reducing the level of safety. It is to be appreciated that the safety state can continue to operate according to this example, while providing the higher level of availability. At 1106, a voting configuration can be generated based on the allocation of safety and availability. When generating the voting configuration, a number of factors can be considered such as, for instance, a likelihood of common mode failure, faults associated with various industrial automation devices (e.g., historical data related to faults, faults that are currently existent, . . . ), etc. The generated voting configuration can be utilized to combine outputs from a number of industrial automation devices. At 1108, new performance limits can be generated based at least in part upon the voting configuration.

For instance, performance limits related to a torque, speed, human exposure, and/or any other characteristic associated with a machine, process, etc. can be yielded to facilitate providing the allocated amount of safety and/or availability associated with the voting configuration.

With reference to FIG. 12, illustrated is a methodology 1200 that facilitates updating utilization of available redundancy in an industrial automation environment. At 1202, an amount of available redundancy in an industrial automation environment can be evaluated. The amount can be determined automatically upon including industrial automation devices into the environment, after configuring a device added to the environment, by way of user input, a combination thereof, etc. At 1204, a voting configuration can be generated that utilizes the available redundancy. Thus, a voting configuration can be yielded that provides for an optimized level of safety and/or availability. The voting configuration can thereafter be employed to combine outputs, measured values, faults, votes, etc.

At 1206, event(s) associated with the industrial automation environment can be monitored. For instance, occurrence of a fault, addition and/or removal of industrial automation device(s) and/or redundancy, location of users, or any characteristic associated with the environment and/or one or more devices can be assessed. By way of example, a failure of a logic solver can be identified; however, the claimed subject matter is not so limited. At 1208, the voting configuration can be dynamically updated to optimize the utilization of the available redundancy in view of the monitored event(s). Pursuant to an example, when additional redundancy is provided, the voting configuration can be dynamically updated to readjust the allocation between safety and/or availability. According to another illustration, upon determining that a significant risk of harm (e.g., damage, injury, . . . ) exists, the voting configuration can be reconfigured to provide for a higher level of safety; thus, the updated voting configuration can provide for combining various information in a manner that yields a higher level of safety as compared to the prior voting configuration. It is to be appreciated that the claimed subject matter is not limited to the aforementioned examples. At 1210, new performance limits can be generated based at least in part upon the updated voting configuration (and/or the allocation of safety and availability associated therewith).

Figure 13:
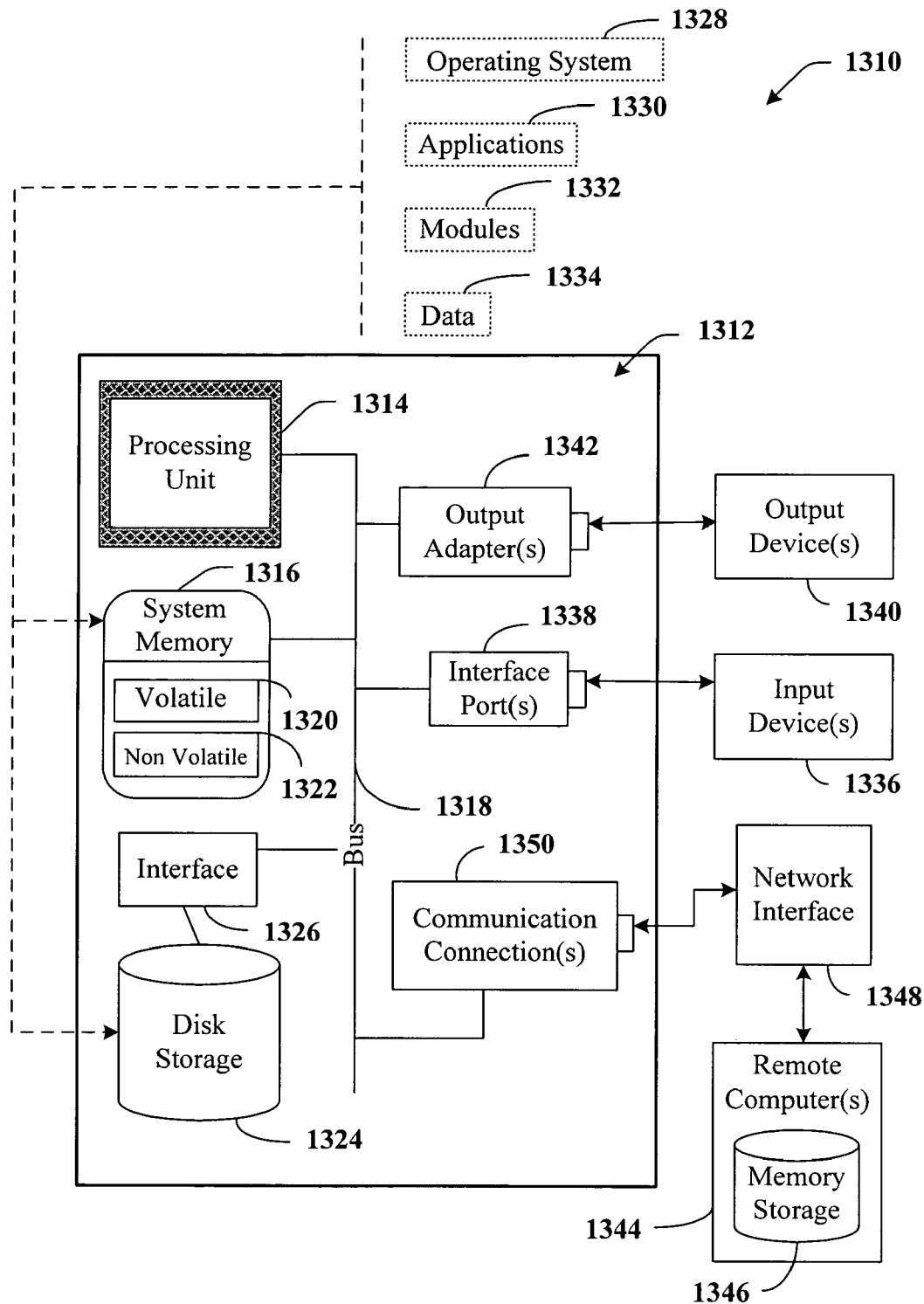
FIG. 13 is an example operating system upon which various features described herein can be implemented.

With reference to FIG. 13, an exemplary environment 1310 for implementing various aspects includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the subject innovation can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
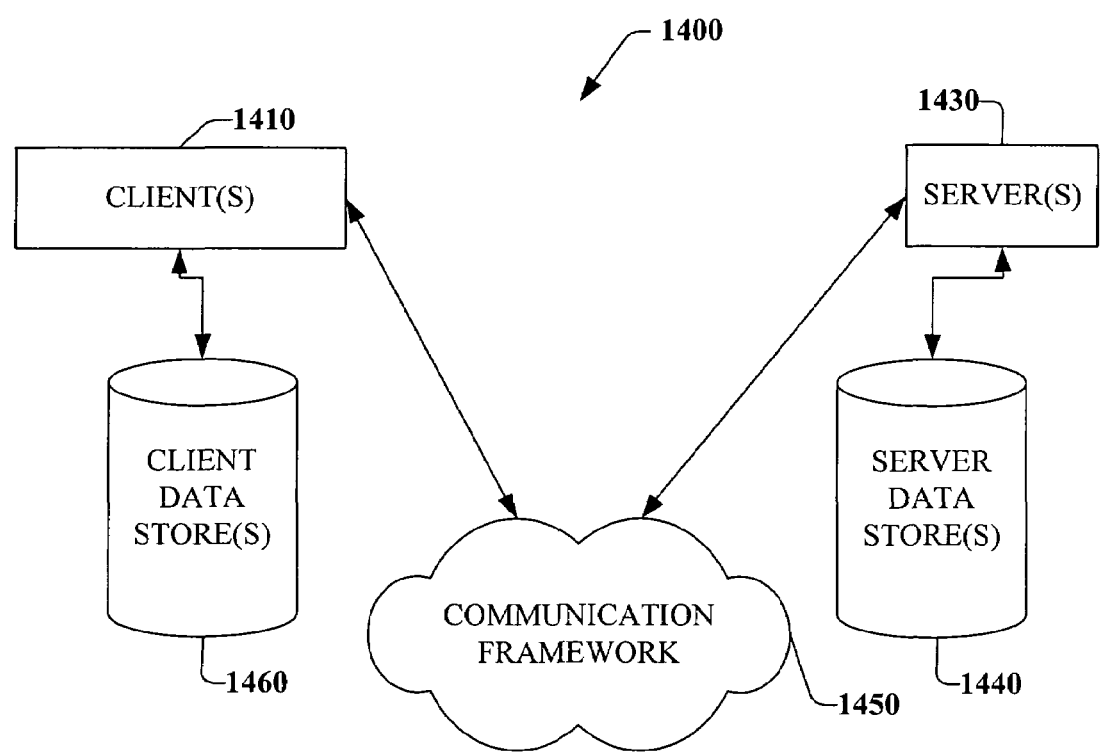
FIG. 14 is an exemplary computing environment within which various features described herein can interact.

FIG. 14 is a schematic block diagram of a sample-computing environment 1400 with which the claimed subject matter can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the subject innovation, for example. One possible communication between a client 1410 and a server 1430 can be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system that configures available redundancy, comprising:
   a processor;
   a memory communicatively coupled to the processor, the memory having stored therein computer-executable instructions to implement the system, including:
      an interface component that obtains input data, the input data includes information related to an added industrial automation device;
      a redundancy assessment component that evaluates the input data to identify an amount of available redundancy;
      an optimization component that generates a voting configuration that allocates the amount of available redundancy to provide an optimized combination of safety and availability based at least in part on the input data.

2. The system of claim 1, the interface component obtains the input data from at least one of an industrial automation device or a user.

3. The system of claim 1, the redundancy assessment component evaluates resources associated with at least one of an industrial automation environment, a machine, or a process and determines an amount of available redundancy therefrom.

4. The system of claim 1, further comprising a diversification component that analyzes likelihoods of common mode failure associated with one or more voting configurations that employ the available redundancy, and the optimization component utilizes the likelihoods in connection with selecting the voting configuration that provides the optimized combination.

5. The system of claim 1, further comprising a monitor component that detects at least one of a failure or degradation associated with an industrial automation device.

6. The system of claim 5, the monitor component provides a corrective response to the detected failure.

7. The system of claim 6, wherein the corrective response provided by the monitor component at least one of stops operation, permits further operation, or allows for continued operation at a degraded in response to the detected failure.

8. The system of claim 1, further comprising an initialization component that generates an initial voting configuration at a time of setup of an industrial automation environment.

9. The system of claim 1, further comprising a real time evaluation component that monitors real time events associated with an industrial automation environment.

10. The system of claim 9, the real time evaluation component evaluates one or more of a level of risk or a level of availability associated with at least one of a system or process at a particular time.

11. The system of claim 1, further comprising a dynamic configuration component that adjusts utilization of the available redundancy and generates an updated voting configuration.

12. The system of claim 11, the dynamic configuration component generates the updated voting configuration based at least in part upon a monitored real time event.

13. The system of claim 11, the dynamic configuration component utilizes a rule set that provides an adjustment related to the combination of safety and availability associated with a monitored event.

14. The system of claim 1, further comprising a combination component that assembles information from a plurality of industrial automation devices in accordance with the voting configuration.

15. The system of claim 14, the combination component utilizes weights related to an ability of each of the devices to provide accurate data.

16. The system of claim 1, further comprising a remote redundancy component that at least one of adds or removes additional redundancy provided by remote devices.

17. The system of claim 16, the remote redundancy component negotiates acquisition of additional redundancy and the optimization component generates an updated voting configuration that accounts for the additional redundancy.

18. The system of claim 17, the optimization component being provided remotely to generate the updated voting configuration.

19. A method that facilitates optimizing utilization of redundancy in an industrial automation environment, comprising:
   a processor-implemented act of executing computer executable instructions stored on a computer readable storage medium to implement the following: acts of:
      automatically evaluating and determining an amount of available redundancy;
      determining an allocation between safety and availability based at least in part upon the available redundancy;
      generating a voting configuration based on the allocation that provides an optimized combination of safety and availability; and
      generating performance limits based upon the voting configuration.

20. The method of claim 19, further comprising combining outputs from a plurality of industrial automation devices in accordance with the voting configuration.

21. The method of claim 20, further comprising combining the outputs based at least in part upon weights associated with abilities of the industrial automation devices to provide accurate measurements.

22. The method of claim 19, evaluating the amount of available redundancy further comprises at least one of identifying a number of industrial automation devices included in the environment, determining locations of the devices, or evaluating associations between the devices.

23. The method of claim 19, further comprising configuring an industrial automation device included in the industrial automation environment and evaluating the amount of available redundancy utilizing information associated with the configuration.

24. The method of claim 19, further comprising determining the allocation between safety and availability based at least in part upon evaluating characteristics associated with at least one of the industrial automation environment, an industrial automation device, a machine, or a process.

25. The method of claim 24, the characteristics comprise at least one of a likelihood of failure or an amount of harm associated with the failure.

26. The method of claim 19, further comprising allocating resources to provide for increased safety when a high level of risk of damage associated with continued operation exists.

27. The method of claim 19, further comprising allocating resources to provide for increased availability when downtime yields significant costs.

28. The method of claim 19, further comprising generating the voting configuration based upon at least one of a likelihood of common mode failure, faults currently associated with industrial automation devices, or historical fault related information.

29. The method of claim 19, further comprising monitoring an event associated with the industrial automation environment.

30. The method of claim 29, the events comprise at least one of an occurrence of a fault, an addition of redundancy, a removal of redundancy, or a change in location of a user.

31. The method of claim 29, further comprising dynamically updating the voting configuration to optimize utilization of the available redundancy in view of the monitored event.

32. A system that configures voting in an industrial automation environment, comprising:
   a processor;
   a memory communicatively coupled to the processor, the memory having stored therein computer-executable instructions to implement the system, including:
      means for obtaining input data that includes information related to an added industrial device;
      means for evaluating the input data to identify an amount of available redundancy;
      means for generating a voting configuration with an optimized allocation of the available redundancy between safety and availability that enables obtaining performance limits; and
      means for combining data from a plurality of industrial automation devices in accordance with the voting configuration.

33. An industrial automation system that configures available redundancy, comprising:
   a processor;
   a memory communicatively coupled to the processor, the memory having stored therein computer-executable instructions to implement the system, including:
      an interface component that obtains input data;
      an optimization component that generates a voting configuration that allocates the amount of available redundancy to provide an optimized combination of safety and availability based at least in part on the input data; and
      a combination component that assembles information from a plurality of industrial automation devices in accordance with the voting configuration.

34. An industrial automation system that configures available redundancy, comprising:
   a processor;
   a memory communicatively coupled to the processor, the memory having stored therein computer-executable instructions to implement the system, including:
      an interface component that obtains input data;
      an optimization component that generates a voting configuration that allocates the amount of available redundancy to provide an optimized combination of safety and availability based at least in part on the input data; and
      a remote redundancy component that at least one of adds or removes additional redundancy provided by remote devices.

* * * * *

UNITED STATES PATENT AND TRADEMARK OFFICE
CERTIFICATE OF CORRECTION

PATENT NO. : 7,657,814 B2  Page 1 of 1
APPLICATION NO. : 11/360177
DATED : February 2, 2010
INVENTOR(S) : Schuster et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1016 days.

Signed and Sealed this

Thirtieth Day of November, 2010

David J. Kappos
*Director of the United States Patent and Trademark Office*